United States Patent
Candelore et al.

(10) Patent No.: US 12,334,076 B2
(45) Date of Patent: Jun. 17, 2025

(54) SELECTIVE SPEECH-TO-TEXT FOR DEAF OR SEVERELY HEARING IMPAIRED

(71) Applicant: Sony Group Corporation, Tokyo (JP)

(72) Inventors: Brant Candelore, Poway, CA (US); Mahyar Nejat, La Jolla, CA (US)

(73) Assignee: SONY GROUP CORPORATION, Tokyo (JP)

(*) Notice: Subject to any disclaimer, the term of this patent is extended or adjusted under 35 U.S.C. 154(b) by 311 days.

(21) Appl. No.: 17/968,318

(22) Filed: Oct. 18, 2022

(65) Prior Publication Data

US 2024/0127821 A1 Apr. 18, 2024

(51) Int. Cl.
*G10L 15/00* (2013.01)
*G10L 15/26* (2006.01)

(52) U.S. Cl.
CPC ................... *G10L 15/26* (2013.01)

(58) Field of Classification Search
None
See application file for complete search history.

(56) References Cited

U.S. PATENT DOCUMENTS

| | | | | |
|---|---|---|---|---|
| 2015/0036856 A1* | 2/2015 | Pruthi | ............... | G10L 15/26 381/317 |
| 2015/0288815 A1 | 10/2015 | Charugundla | | |
| 2017/0018272 A1* | 1/2017 | Lee | ............... | G06Q 30/02 |
| 2019/0121532 A1* | 4/2019 | Strader | ............... | G16H 80/00 |
| 2021/0271115 A1* | 9/2021 | Zhang | ............... | H04R 1/2803 |
| 2022/0267023 A1* | 8/2022 | Baladhandapani | .... | B64D 45/00 |
| 2022/0318549 A1* | 10/2022 | St. Amant | ............... | G06V 10/25 |

FOREIGN PATENT DOCUMENTS

| | | | | |
|---|---|---|---|---|
| WO | WO-2017142775 A1 * | 8/2017 | ............... | G10L 13/033 |
| WO | WO-2024084299 A1 * | 4/2024 | ............... | G10L 15/26 |

OTHER PUBLICATIONS

Mohammad Reza Mirzaei et al.; "Audio-visual speech recognition techniques in augmented reality environments"; Published online: May 18, 2013; © Springer-Verlag Berlin Heidelberg 2013; Vis Comput (2014) 30:245-257; DOI 10.1007/s00371-013-0841-1—13 pages.

* cited by examiner

*Primary Examiner* — Satwant K Singh
(74) *Attorney, Agent, or Firm* — Trellis IP Law Group, PC

(57) ABSTRACT

A method for providing selectivity to a speech-to-text system operates a voice transcription assistant coupled to the speech-to-text system such that speech detected by the speech-to-text system is not transcribed into text for display to a user unless the voice transcription assistant determines that the detected speech is relevant to the user.

Smart glasses, including at least one microphone, a speech-to-text processing unit, a display, and a voice transcription assistant, provide selective speech-to-text functionality. The voice transcription assistant has one or more processors; and logic encoded in one or more non-transitory media for execution by the one or more processors and when executed operable to prevent the speech-to-text processing unit providing text to the display in response to the reception of speech by the microphone unless the logic determines that the received speech is relevant to the user.

4 Claims, 3 Drawing Sheets

SELECTIVE SPEECH-TO-TEXT FOR DEAF OR SEVERELY HEARING IMPAIRED

BACKGROUND

Speech-to-text technology can be very helpful to a range of people with hearing impairments, from the profoundly deaf to people with relatively minor hearing deficits, in enabling them to keep track in real time of what people in the vicinity are saying by viewing the transcribed text on for example, a smartphone display, a laptop screen, or Augmented Reality (AR) glasses. Such technology overcomes some of the disadvantages of prior methods of communication specifically for the deaf, such as lip reading, for which the lips of the speaker must be clearly visible to the recipient and the speaker may have to exaggerate or otherwise modify their way of speaking, or sign language, for which not only must the hands (and ideally the face) of the speaker be visible but the speaker must have some prior training in the specific sign language known to the user. This does not apply to speech-to-text systems, as pick up does not require line of sight, and no special effort is called for on the part of the speaker.

However, current speech-to-text systems function by receiving and transcribing essentially all speech that can be detected with acceptable quality, regardless of the relevance of any particular piece of speech to the user. A speech-to-text system may be overwhelmed by detecting overlapping speech from multiple sources. Even in less extreme situations, a conversation between two people near the user but not speaking to that user, may be picked up, processed, and displayed, regardless of whether it is of any interest to the user. Moreover, that displayed material may be a distraction, rendering text corresponding to other remarks intentionally directed to the user less obvious, causing some confusion or delay in the ability of the user to pay attention and respond to those remarks, or to other speech occurring in the same time frame that is of personal interest for any other reason.

There is therefore a need for systems and methods that impose some selectivity into the process, determining which speech is worthy of being transcribed for display to the user, so that the user can see material of personal relevance quickly, and thus participate more meaningfully in the communication process. This may be particularly valuable in educational settings where a teacher may want to draw the hearing-impaired user's attention to some particular item of instruction or guidance, or simply to ask the student a direct question. For the user to perceive quickly that the item or question is intentionally directed to them would obviously be beneficial. Similarly, in social settings, conversation within a group of which the user is a member may be much more interesting to the user than conversation in another group of people, located near enough to be "heard", so for the user to not be shown text corresponding to the latter might be a welcome simplification.

Different criteria may be appropriate to determine relevance for different environments, so ideally, improved systems and methods would offer users some choice in selecting criteria of relevance according to their personal situation and personal preferences.

SUMMARY

The present invention includes methods and systems or devices providing selectivity to speech-to-text systems, the selectivity being based on estimations of likely relevance to the users, the people being shown the transcribed text.

In one embodiment, a method comprises operating a voice transcription assistant coupled to a speech-to-text system such that speech detected by the speech-to-text system is not transcribed into text for display to a user of the system unless the voice transcription assistant determines that the detected speech is relevant to the user. Relevance is defined for the purposes of this disclosure as meaning of likely interest to the user, or likely to be beneficial to the user in some other way. In one aspect of the invention, the voice transcription assistant makes the determination of relevance on the basis of whether the detected speech exceeds a threshold loudness value, loudness being indicative of proximity to the user of a person generating the detected speech. In another aspect of the invention, the voice transcription assistant makes the determination of relevance on the basis of whether a keyword is identified in the detected speech.

In another embodiment, a voice transcription assistant provides selectivity to a speech-to-text system comprising a microphone, a display and a transcription unit, where the voice transcription assistant comprises: one or more processors; and logic encoded in one or more non-transitory media for execution by the one or more processors and when executed operable to prevent the speech-to-text transcription unit from providing text to the display in response to the reception of speech by the microphone unless the logic in the voice transcription assistant determines that the received speech is relevant to the user. In one aspect of the invention, the voice transcription assistant makes the determination of relevance on the basis of whether the received speech exceeds a threshold loudness value, loudness being indicative of proximity to the user of a person generating the received speech. In another aspect of the invention, the voice transcription assistant makes the determination of relevance on the basis of whether a keyword is identified in the received speech.

In yet another embodiment, smart glasses comprise: one or more microphones, a speech-to-text processing unit; a display in a line of sight of a user wearing the smart glasses; and a voice transcription assistant comprising: one or more processors; and logic encoded in one or more non-transitory media for execution by the one or more processors and when executed operable to prevent the speech-to-text processing unit from providing text to the display in response to the reception of speech by the one or more microphones unless the logic in the voice transcription assistant determines that the received speech is relevant to the user.

A further understanding of the nature and the advantages of particular embodiments disclosed herein may be realized by reference to the remaining portions of the specification and the attached drawings.

DETAILED DESCRIPTION OF EMBODIMENTS

Described herein are embodiments of devices and methods for providing selectivity to speech-to-text systems, based on determinations of relevance to the corresponding users.

Figure 1:
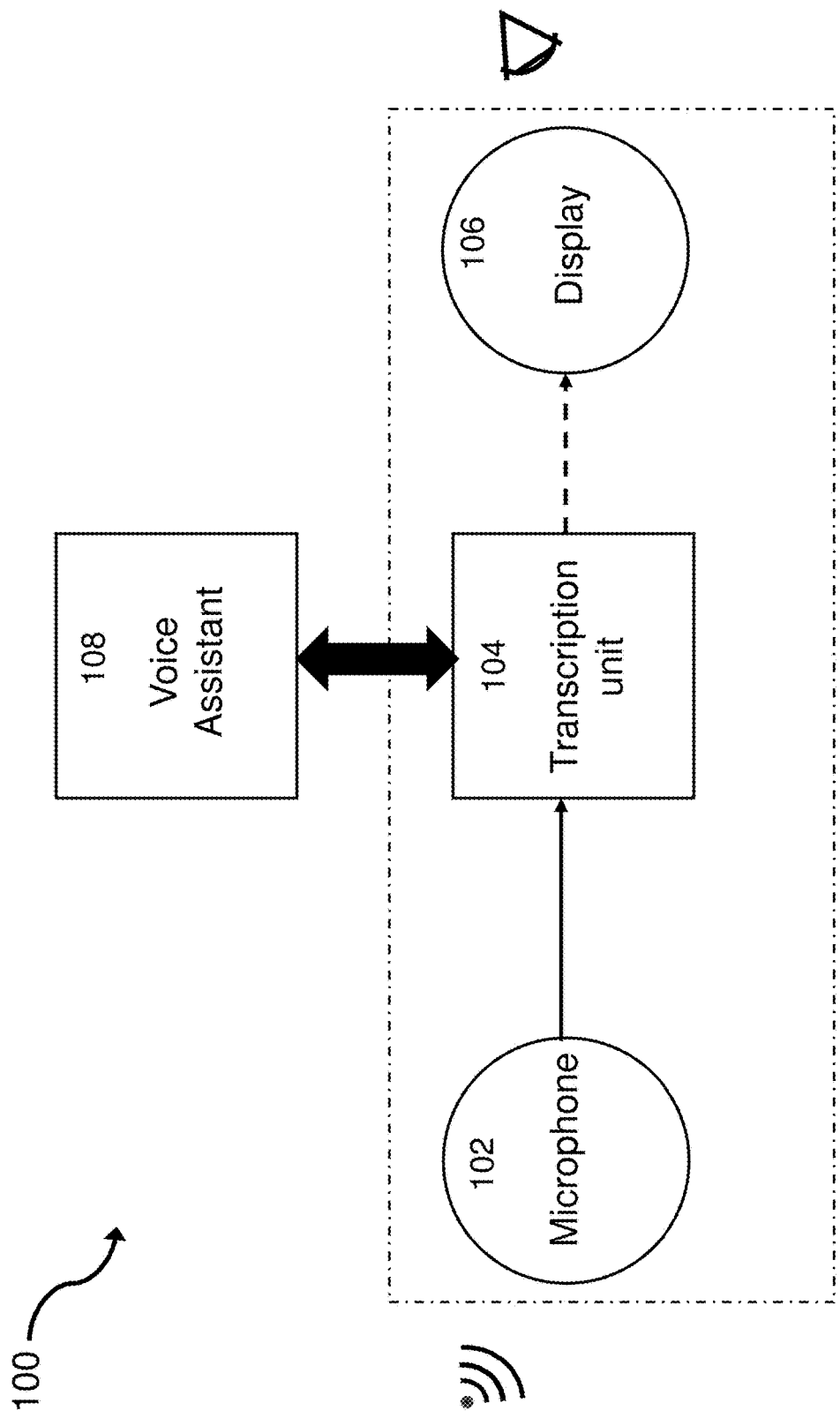
FIG. 1 illustrates components of a system operating according to some embodiments of the invention.

FIG. 1 illustrates components of a selective speech-to-text system 100 according to some embodiments of the invention. In the shown embodiment, there is only one microphone 102, although in some embodiments to be described later there may be two or more microphones, receiving external audio input from the surroundings of the system 100 and the user employing it. Microphone 102 delivers an electrical output corresponding to received audio input to speech-to-text system transcription unit 104, which contains processing power and logic suitable for carrying out word recognition to detect speech and then transcribe that speech into readable form i.e., text. The text may then be presented on display 106. While currently available speech-to-text system systems make use of components 102, 104 and 106 (shown within a dashed rectangular outline in the figure, for clarity; they would not necessarily be integrated within a single housing), the present invention includes an additional component, voice transcription assistant 108, which controls interactions between the other components to add selectivity to system 100, as follows.

The objective of voice transcription assistant 108 is to prevent speech detected by the speech-to-text system from being transcribed into text for display to a user unless the voice transcription assistant determines that the text may be relevant to the user. To achieve this, the voice transcription assistant must be coupled to one or more other components of the speech-to-text system, serving a controlling or filtering role, in which it makes a determination of relevance using one or more criteria. The thick, double headed arrow in FIG. 1 indicates this coupling, showing the flow of data to and from the voice transcription assistant. For simplicity, the coupling is shown as being directly to transcription unit 104, but the exact position in the data path at which the voice transcription assistant intercepts signals traveling (horizontally as shown in the figure) from microphone 102 through transcription unit 104 to display 106 may vary in different embodiments, ranging from a position before the microphone output reaches transcription unit 104 (which would be to the left of 104 in the figure, but not as far as 102) to a position after unit 104 has performed word recognition and transcription and is ready to provide text to display 106 (which would be to the right of 104 in the figure, but not as far as 106). The dashed line between 104 and 106 indicates the essential point, that data flow along this path will only occur under some conditions, as determined by voice transcription assistant 108.

Figure 2:
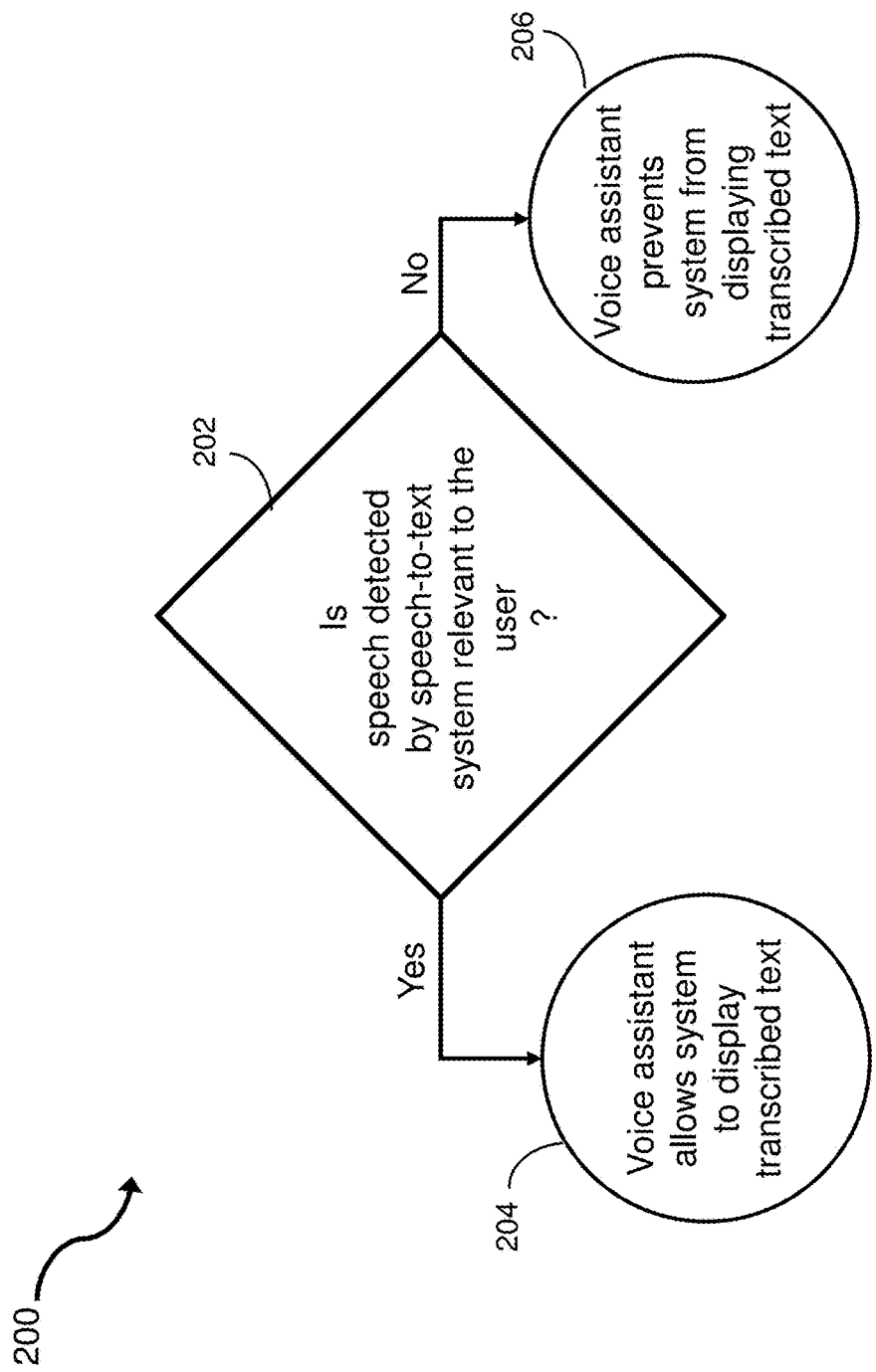
FIG. 2 is a flowchart illustrating a method according to some embodiments of the invention.

FIG. 2 is a flowchart illustrating a method 200 according to some embodiments of the invention. The voice transcription assistant decides at step 202 whether speech detected by a speech-to-text system is relevant to the user of that speech-to-text system. If the decision is positive, step 204 is carried out, in which the voice transcription assistant allows transcribed text of the detected speech to be displayed. If the decision is negative, step 206 is carried out, in which the voice transcription assistant prevents transcribed text of the detected speech from being displayed.

In some embodiments of the present invention, the voice transcription assistant may be integrated into the speech-to-text system during manufacture. In other embodiments, the voice transcription assistant may be a module that is coupled to a speech-to-text system either during or after manufacture, as an improvement or enhancement to a relatively "standard" speech-to-text system to provide selectivity. The coupling to achieve operational connectivity may in some cases be achieved wirelessly, using Bluetooth or other similar technology.

One example of a reasonable criterion of relevance which the voice transcription assistant may use is loudness, more specifically establishing whether the detected speech exceeds a threshold loudness value, as, other factors being equal, loudness may be taken as directly related to the likelihood that the person generating the speech is directing it to the user; a person positioned close to the user, for example, is more likely to be trying to speak to the user than another person might be, who is at a greater separation, and the loudness of the speech detected by the microphone is probably going to be greater in the former case. Loudness is an indication of proximity in this scenario. In another example, a person facing the user is more likely to be trying to speak to the user than another person might be, who or facing away from the user to address another individual. Again, the loudness of speech received by the microphone is likely to be greater in the former case, with loudness being an indication of the speaker intentionally directing speech to the user.

In some embodiments, in situations where this criterion is used, voice transcription assistant 108 may intercept the output from microphone 102 even before it reaches the speech-to-text system transcription unit 104, as mentioned above. In other embodiments, speech-to-text system unit 104 may partially process the output before voice transcription assistant 108 intervenes. In either case, voice transcription assistant 108 compares a measure of loudness of the speech with a predetermined (though possibly user-adjustable) threshold, only allowing speech-to-text system unit 104 to deliver transcribed text to display 106 if that threshold is exceeded.

Another reasonable criterion of relevance may be establishing whether a keyword is present in the detected speech. In this scenario, the voice transcription assistant may need speech-to-text system unit 104 to process the speech to the point where words can be identified, so that the voice transcription assistant can compare the words in each burst of speech with that keyword, preventing speech-to-text system unit 104 from delivering a section of transcribed text to display 106 unless the burst contains the keyword either at the beginning or closely after the beginning of that burst. A "burst" may be defined either in terms of speech ending in a pause (effectively silence) that persists for a time greater than one time threshold, or of speech lasting for a time up to a another time threshold. Other indications that the speaker is either expecting the user to respond or has in any case finished saying all they wish to for the moment, may be envisaged as well known in the art of artificial intelligence technologies applied to voice recognition, and may be accommodated by embodiments of the present invention.

The keyword is indicative that the speaker intends to address the user, either as an individual, in which case the keyword may be the user's name or nickname, or as a member of a group (e.g., a teacher may want to address a particular study group, with an assigned name like "SGA"). In all these cases, of course, the speaker would have to have prior knowledge of which keyword to use, to be sure of having the corresponding burst of speech transcribed and presented to the user. In some cases, a key-phrase may be more convenient or suitable, but the term keyword is used throughout this disclosure for simplicity, and should be understood as encompassing the term "key-phrase".

A third example of a reasonable criterion on which to base a determination of relevance is voice recognition of the person who is generating the detected speech. A user may want to be shown all detected speech originating from one or more particular individuals, such as a parent, a teacher, a spouse, or a close friend. In all such cases, of course, the voice transcription assistant would have to have access to previously captured voice prints of the individuals in question. After the signals passed to speech-to-text system 104 from microphone 102 are processed by the speech-to-text system to the stage where the voice transcription assistant is able to establish whether or not there is a correspondence with a voiceprint of one of the individuals of interest, the transcribed text of the speech from a recognized voice is passed on the display, while speech from other individuals may not be.

Rather than specifying one or more particular criteria of relevance, an alternative approach to determining relevance may be to depend on the user specifying a relevance mode "option" at a higher level, based on the environment that the user finds themselves in. For instance, it is envisioned that the mode setting could be set to, e.g. home, school or classroom, outside, office, store, or restaurant. In a school mode setting, the voice transcription assistant would probably include voice recognition of a teacher, while in other modes, that voice might not be even checked. The mode setting might be something that could be set automatically by using GPS location signals.

As an example, in some embodiments, the voice transcription assistant may be responsive to the user specifying a "classroom mode" option, which may be taken as a shorthand way of instructing the voice transcription assistant to make the determination of relevance based on one or more specific criteria, such as a keyword relevance criterion, the keyword being a name of the user, and/or voice recognition of the teacher. The relevance mode may be chosen by the user from a list including, for example, a "personal conversation mode", which might involve voice recognition and a relatively high loudness threshold (to cut off more background speech) or a "quiet mode", which might only transcribe speech prefaced by a keyword indicating urgency—"urgent" for example—and/or speech from one particular individual.

In some embodiments that depend on a voice recognition criterion, the recognition in any particular instance may not be absolutely clear-cut. In other words, the level of confidence that the detected voice is a match for the individual of interest may be significantly below 100%. A beneficial feature for a selective speech-to-text system of the present invention may therefore be one an option in which the voice transcription assistant prevents text being displayed (when voice recognition is the operative relevance criterion) unless the voice transcription assistant estimates that the confidence level of the voice recognition of the corresponding burst of speech is over a particular threshold, such as 85% for example. This could greatly reduce the likelihood of an unknown speaker's speech being mistakenly presented for display to the user, although at the cost of a slight increase in the likelihood that speech from a known person of interest would also be missed.

In all the embodiments discussed above, there is an implication that the speech-to-text system is capable of correctly identifying all the words in a burst of speech. This assumes that the speech reaching the microphone is loud enough to be detected over ambient noise, that subsequent circuitry does not introduce additional noise overcoming the signal, and that the word recognition software performs perfectly. In practice, as anyone who has used closed captioning on broadcast or streamed AV transmissions is aware, the technology for word recognition, especially in natural speech, is far from perfect, even with signals of adequate signal to noise ratios. The display of a speech-to-text system such as those envisaged by the present invention may therefore end up showing sentences in which many words are incorrect or missing with some sentences being truncated. A desirable feature for selective speech-to-text system systems would therefore be an option to apply a threshold for the percentage of words in a burst of speech that are clearly distinguished and identified in order for the text transcribed from that speech to be displayed to the user. 90% may be a reasonable threshold to minimize user annoyance.

The speech-to-text system may be partly or wholly integrated into a device like a cellphone, a tablet, a laptop or a desktop computer. A wearable device, such as smart glasses, may be particularly attractive in terms of compactly integrating all four components corresponding to 102, 104, 106, and 108. It may also offer a convenient method of distinguishing directionality of a source of speech relative to the user's position, as will be discussed now with reference to FIG. 3.

Figure 3:
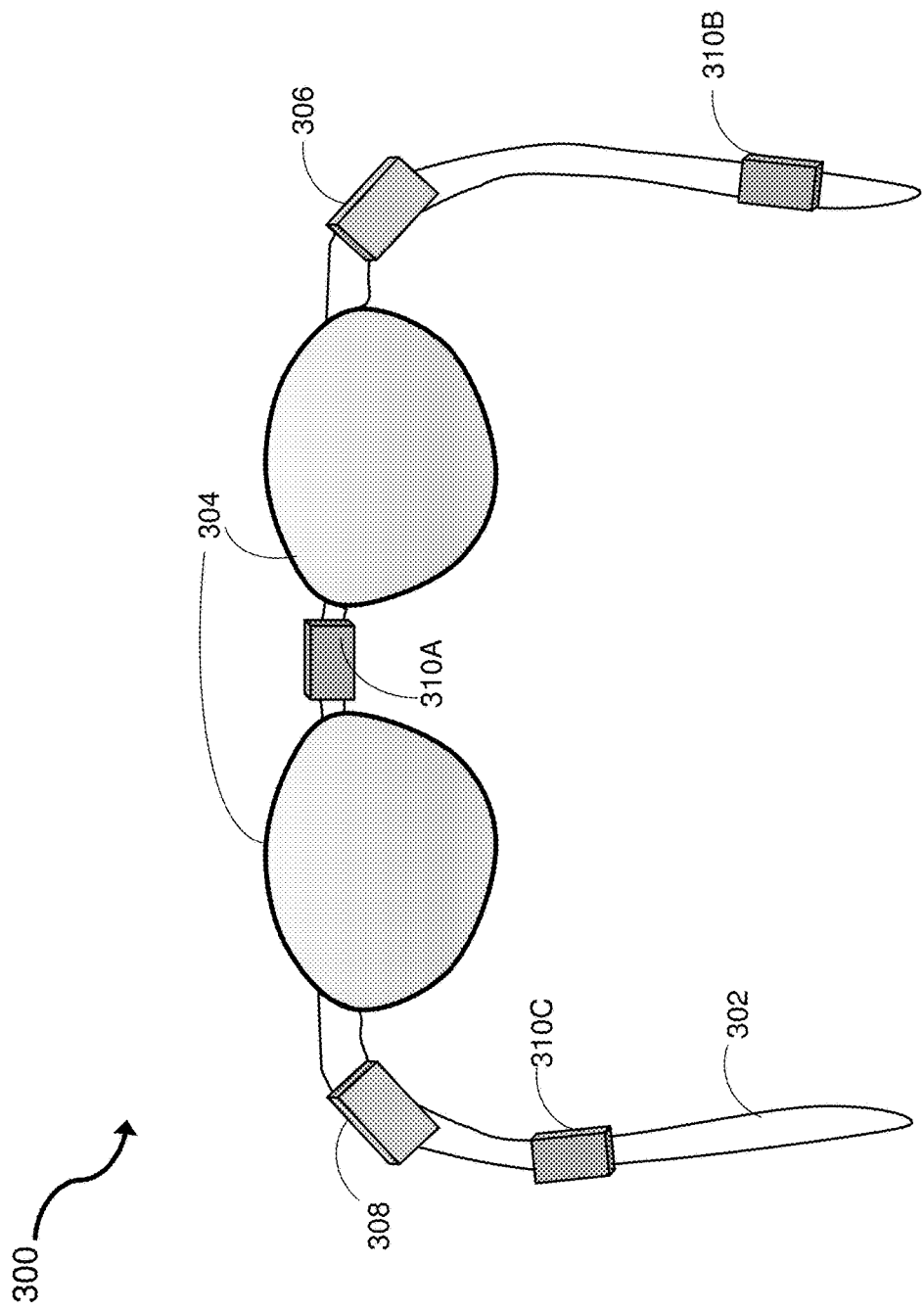
FIG. 3 illustrates smart glasses according to some embodiments of the invention.

FIG. 3 illustrates a rough perspective view of smart glasses 300, comprising a frame 302, display 304, a speech-to-text system processing unit 306, a voice transcription assistant 308, and microphones 310A, 310B, and 310C. The number of microphones present may vary in other embodiments, as will be discussed below, but at least one microphone must be present, typically positioned as shown for microphone 310A, configured to detect speech from a source in front of the smart glasses, which would mean in front of a wearer of those glasses. In some embodiments, voice transcription assistant 308, comprising one or more processors and logic required to provide the selectivity of the present invention, as discussed above and below, may be integrated into the speech-to-text system processing unit 306; in the embodiment shown, it is a separate module, with operational connectivity to one or more other components of the speech-to-text system not explicitly shown. As mentioned above, the connectivity may be achieved wirelessly, using Bluetooth technology for example.

Implementation of the invention in the form of smart glasses offers the potential for additional functionality in discriminating between sources of speech in different directions relative to the user. This requires at least two microphones, a first microphone (301A in FIG. 3) configured to be responsive primarily to sound incident on the smart glasses from a frontal direction, and a second microphone (either 310B or 310C) configured to be receptive primarily to sound incident on the smart glasses from a rear or lateral direction. This directional dependence may be achieved primarily by appropriate positioning of the microphones, as roughly indicated in FIG. 3. Using three or more microphones at different positions and/or orientations would of course allow for greater spatial coverage.

Comparison of signals output by the different microphones allows the voice transcription assistant to give priority to speech-to-text processing and display of received speech determined to be generated by a person in front of the user over the processing and display of received speech determined to be generated by a person behind or lateral to the user.

Although the description has been described with respect to particular embodiments thereof, these particular embodiments are merely illustrative, and not restrictive.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other non-transitory media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method of providing selectivity to a speech-to-text system, the method comprising:
    operating a voice transcription assistant coupled to the speech-to-text system such that speech detected by the speech-to-text system is not transcribed into text for display to a user unless the voice transcription assistant determines that the detected speech is relevant to the user;
    wherein the voice transcription assistant makes the determination of relevance on the basis of whether a keyword is identified in the detected speech; and
    wherein the keyword is a name of a group of which the user is a member.

2. A method of providing selectivity to a speech-to-text system, the method comprising:
    operating a voice transcription assistant coupled to the speech-to-text system such that speech detected by the speech-to-text system is not transcribed into text for display to a user unless the voice transcription assistant determines that the detected speech is relevant to the user;
    wherein the voice transcription assistant determines relevance based on voice recognition of an individual of interest generating the detected speech.

3. A voice transcription assistant providing selectivity to a speech-to-text system comprising a microphone, a display and a speech-to-text transcription unit, the voice transcription assistant comprising:
    one or more processors; and
    logic encoded in one or more non-transitory media for execution by the one or more processors and when executed operable to prevent the speech-to-text transcription unit from providing text to the display in response to the reception of speech by the microphone unless the logic in the voice transcription assistant determines that the received speech is relevant to the user;
    wherein the logic determines relevance based on voice recognition of an individual of interest generating the received speech.

4. Smart glasses providing selective speech-to-text functionality, the smart glasses comprising:
    one or more microphones;
    a speech-to-text processing unit;
    a display in a line of sight of a user wearing the smart glasses; and
    a voice transcription assistant comprising:
    one or more processors; and
    logic encoded in one or more non-transitory media for execution by the one or more processors and when executed operable to prevent the speech-to-text processing unit from providing text to the display in response to reception of speech by the one or more microphones unless the logic in the voice transcription assistant determines that the received speech is relevant to the user;
    wherein the one or more microphones comprise a first microphone, configured to be responsive primarily to sound incident on the smart glasses from a frontal direction, and a second microphone, configured to be receptive primarily to sound incident on the smart glasses from a rear or lateral direction; and
    wherein the logic is further operable to prioritize speech-to-text processing and display of received speech determined to be generated by a person in front of the user over received speech determined to be generated by a person behind or lateral to the user.

* * * * *